United States Patent
Kato et al.

(10) Patent No.: US 12,331,694 B2
(45) Date of Patent: Jun. 17, 2025

(54) CONSTANT-SPEED TRAVEL APPARATUS

(71) Applicant: Honda Motor Co., Ltd., Tokyo (JP)

(72) Inventors: Akira Kato, Wako (JP); Hiroshi Yamamoto, Wako (JP); Kazumi Miyashita, Wako (JP); Yoshiyuki Misumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 533 days.

(21) Appl. No.: 17/874,085

(22) Filed: Jul. 26, 2022

(65) Prior Publication Data
US 2023/0030345 A1    Feb. 2, 2023

(30) Foreign Application Priority Data
Jul. 27, 2021   (JP) .................. 2021-122119

(51) Int. Cl.
  *F02D 31/00* (2006.01)
  *B60K 31/18* (2006.01)
  *B63H 20/00* (2006.01)

(52) U.S. Cl.
  CPC ........... *F02D 31/002* (2013.01); *B60K 31/18* (2013.01); *B63H 20/00* (2013.01)

(58) Field of Classification Search
  CPC ........ F02D 31/002; B60K 31/18; B63H 20/00
  See application file for complete search history.

(56) References Cited

U.S. PATENT DOCUMENTS

| 2007/0155258 A1* | 7/2007 | Kaji ................ B63H 21/213 123/399 |
| 2007/0293103 A1* | 12/2007 | Kinoshita ............ F02D 11/02 440/1 |
| 2014/0012440 A1 | 1/2014 | Inoue |
| 2017/0274972 A1* | 9/2017 | Anma ................ F02D 11/02 |

FOREIGN PATENT DOCUMENTS

| JP | 2004142538 A | 5/2004 |
| JP | 2014012460 A | 1/2014 |

OTHER PUBLICATIONS

Japanese office action; Application 2021-122119; Apr. 23, 2024.

* cited by examiner

*Primary Examiner* — Stephen P Avila
(74) *Attorney, Agent, or Firm* — Duft & Bornsen, PC (57) ABSTRACT

Constant-speed-travel-apparatus controlling prime-mover so that mobile-body mounted with the prime-mover travels at constant-speed, includes: function-operation-member being instructed activation of speed-maintaining-function of the mobile-body in response to operation by operator; first-speed-operation-member being instructed the travel-speed of the mobile-body in accordance with operation-amount by the operator; second-speed-operation-member being instructed change of the travel-speed by predetermined amount in response to operation by the operator in state where activation of the speed-maintaining-function has been instructed through the function-operation-member; and electronic-control-unit controlling output of the prime-mover based on the operation-amount of the first-speed-operation-

(Continued)

member and number of times of operation of the second-speed-operation-member so that the mobile-body travels at constant-speed in the state.

8 Claims, 6 Drawing Sheets

CONSTANT-SPEED TRAVEL APPARATUS

CROSS-REFERENCE TO RELATED APPLICATION

This application is based upon and claims the benefit of priority from Japanese Patent Application No. 2021-122119 filed on Jul. 27, 2021, the content of which is incorporated herein by reference.

BACKGROUND OF THE INVENTION

Field of the Invention

This invention relates to a constant-speed travel apparatus configured to control a prime mover so that a mobile body mounted with the prime mover travels at a constant speed.

Description of the Related Art

Conventionally, as this type of apparatus, apparatuses are known that control a throttle opening of an outboard motor so that a boat mounted with the outboard motor travels at a constant speed (for example, Japanese Unexamined Patent Publication No. 2004-142538 (JP2004-142538A)). The apparatus described in JP2004-142538A, when a target value of the travel speed is set through the control panel of the operator's seat, the cruise mode is activated in which throttle opening is controlled so that the travel speed becomes the target value. Then, when the remote control lever of the operator's seat is operated during the cruise mode, the normal mode is activated in which the throttle opening is controlled in accordance with operation amount of the remote control lever.

By controlling a prime mover so that a mobile body maintains an appropriate travel speed, it is possible to improve transfer efficiency and smoothness, reduce $CO_2$ emissions associated with transfer, and reduce the environmental burden.

Incidentally, for example, in a trolley fishing in which a lure is flown to fish, the operator is required to control the flow of the lure by finely adjusting the throttle opening of engine of outboard motor. However, in the apparatus described in JP2004-142538A, when a change command for the travel speed is inputted by the operator through the remote control lever in the cruise mode, the cruise mode is switched to the normal mode, and therefore, it is difficult to keep cruising at a travel speed desired by the operator.

SUMMARY OF THE INVENTION

An aspect of the present invention is a constant-speed travel apparatus configured to control a prime mover so that a mobile body mounted with the prime mover travels at a constant speed. The constant-speed travel apparatus includes: a function operation member configured to be instructed activation of a speed maintaining function for maintaining a travel speed of the mobile body in response to operation by an operator; a first speed operation member configured to be instructed the travel speed in accordance with an operation amount by the operator; a second speed operation member configured to be instructed a change of the travel speed by a predetermined amount in response to operation by the operator in a state where activation of the speed maintaining function has been instructed through the function operation member; and an electronic control unit configured to control an output of the prime mover based on the operation amount of the first speed operation member and a number of times of operation of the second speed operation member so that the mobile body travels at a constant speed in the state where activation of the speed maintaining function has been instructed through the function operation member. The electronic control unit deactivates the speed maintaining function and controls the output of the prime mover based on the travel speed instructed through the first speed operation member when the operation amount of the first speed operation member exceeds a predetermined operation amount in the state where activation of the speed maintaining function has been instructed through the function operation member.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
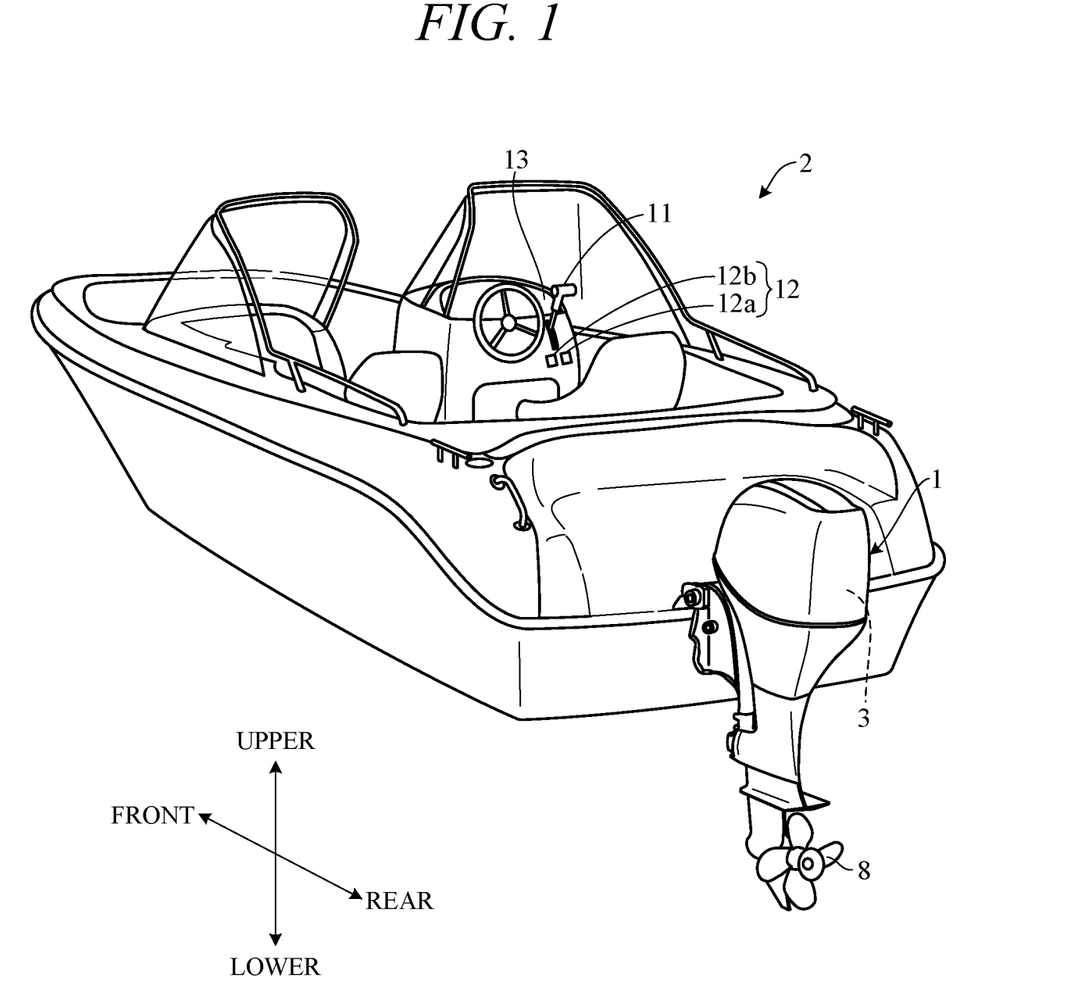
FIG. 1 is a perspective view schematically showing an example of configuration of a boat mounted with an outboard motor to which a constant-speed travel apparatus according to an embodiment of the present invention is applied.
Figure 2:
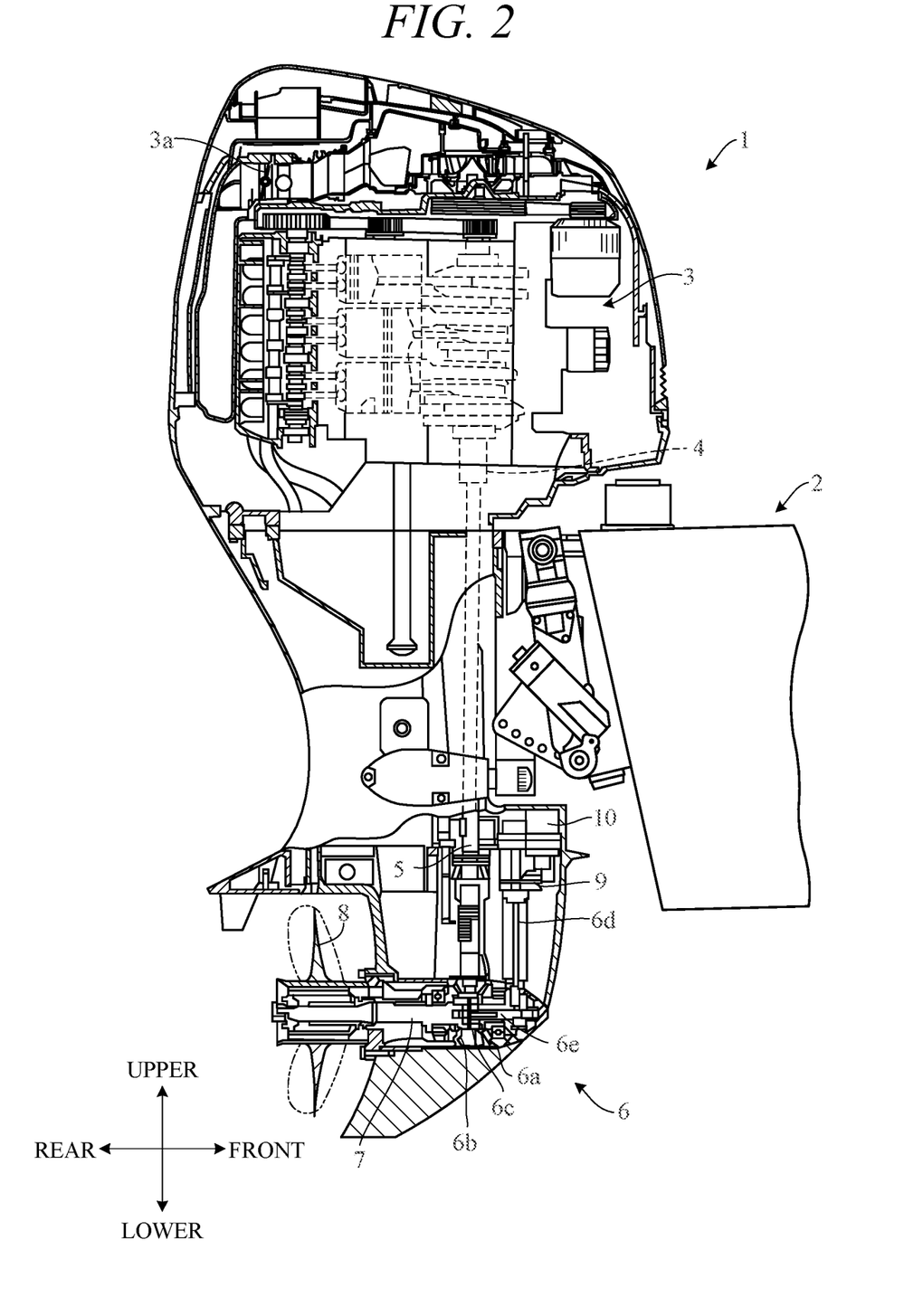
FIG. 2 is a side view of the outboard motor shown in FIG. 1.

An embodiment of the present invention is explained with reference to FIGS. 1 to 7 in the following. A constant-speed travel apparatus according to the embodiment of the present invention is applied to a mobile body mounted with a prime mover. In the following, particularly, an example in which the constant-speed travel apparatus is applied to a boat mounted with an outboard motor engine will be described. FIG. 1 is a perspective view schematically showing an example of configuration of a boat 2 mounted with an outboard motor 1 to which the constant-speed travel apparatus according to the embodiment of the present invention is applied. FIG. 2 is a side view of the outboard motor 1. Hereinafter, for convenience, the vertical direction and the front-rear direction are defined as shown in the drawing, and each part will be described in accordance with this definition.

As shown in FIG. 1, the outboard motor 1 is mounted on a stern of the boat 2. As shown in FIG. 2, for example, an engine 3 configured as a water-cooled spark-ignition gasoline engine is mounted on the upper portion of the outboard motor 1. The engine 3 is arranged so that a crankshaft 4 extends vertically. The engine 3 includes an electric throttle valve 3a configured as, for example, a butterfly valve. By adjusting opening degree (throttle opening) TH of the throttle valve 3a, intake air quantity into the engine 3 is adjusted, and the output of engine 3 (engine output) is adjusted.

The crankshaft 4, which is an output shaft of the engine 3, is connected to a propeller 8 that propels the boat 2 through a vertically extending drive shaft 5, a shift mechanism 6, and a forwardly and rearwardly extending propeller shaft 7. The shift mechanism 6 includes a forward bevel gear 6a and a backward bevel gear 6b which engage with the drive shaft 5, a clutch 6c which engages and disengages the forward bevel gear 6a or the backward bevel gear 6b and the propeller shaft 7, and a shift rod 6d and a shift slider 6e. The upper end of the shift rod 6d is connected to an actuator 10 such as a motor through a reduction gear mechanism 9. The lower end of the shift rod 6d is connected to the shift slider 6e.

The clutch 6c is driven by the actuator 10 through the shift rod 6d and the shift slider 6e to switch the shift position of the shift mechanism 6 between a neutral position, a forward position and a backward position. When the shifted position is switched to the forward position or the backward position, rotation of the engine 3 is transmitted to the propeller shaft 7 through the crankshaft 4, the drive shaft 5, and the shift mechanism 6 so that the propeller 8 rotates and the boat 2 is propelled in the forward direction or the backward direction. By adjusting the throttle opening TH and adjusting the engine output, propulsion of the boat 2 is adjusted and the travel speed is adjusted.

As shown in FIG. 1, an operation lever 11 to be operated by the operator is provided on the control panel in front of the operator's seat of the boat 2. The operation lever 11 is configured to be swingable back and forth from the neutral position in the center.

Figure 3:
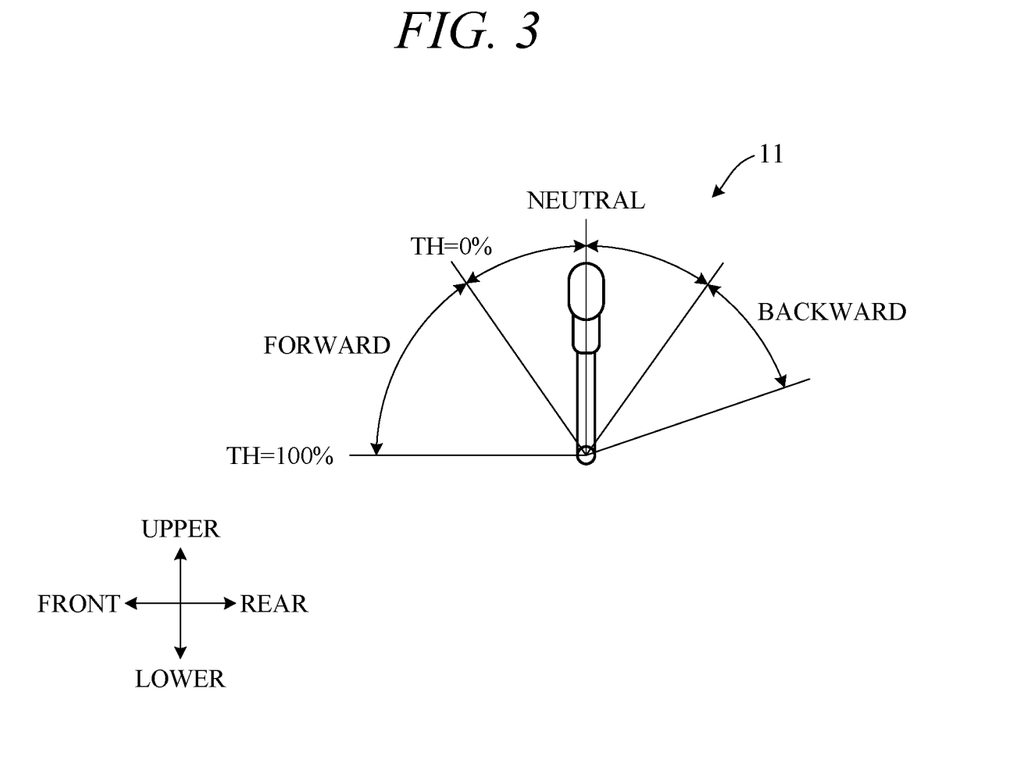
FIG. 3 is a diagram for explaining operation of an operation lever shown in FIG. 1.

FIG. 3 is a diagram for explaining operation of the operation lever 11. As shown in FIG. 3, when the operation lever 11 is switched from the neutral position to the forward position, the shift mechanism 6 (actuator 10) shown in FIG. 2 is switched from the neutral position to the forward position. When the operation lever 11 is switched from the neutral position to the backward position, the shift mechanism 6 is switched from the neutral position to the backward position.

When the operation lever 11, which has been switched to the forward position or the backward position, is further tilted forward or backward, the throttle opening TH and the engine output are adjusted in accordance with the operation amount of the operation lever 11, and the travel speed is adjusted. More specifically, the throttle opening TH is adjusted in the range of 0% to 100% and the engine output and the travel speed are adjusted in accordance with the operation amount of continuous operation of the operation lever 11 in the swing range corresponding to the forward position, i.e. the opening degree (lever opening) of the operation lever 11.

Incidentally, in a trolley fishing in which a lure is flown backward from the boat 2 to fish, the operator is to control the flow of the lure by maintaining the travel speed of the boat 2 or finely adjusting the travel speed as required. In particular, when targeting warm-flow fish such as marlin or tuna, fine-tuning of the throttle opening TH is required as necessary to maintain and fine-tune the travel speed in the mid-speed range of about 10 to 30 km/h.

However, it is difficult to fine-tune the operation amount of the operation lever 11, which corresponds to the throttle opening TH, and it is difficult to fine-tune the travel speed, in successive operation with tilting the operation lever 11 forward or backward. Therefore, in the present embodiment, the constant-speed travel apparatus is configured as follows so that the boat 2 can travel at a constant travel speed desired by the operator by simplifying operations by the operator for maintaining and fine-tuning the travel speed.

Figure 4:
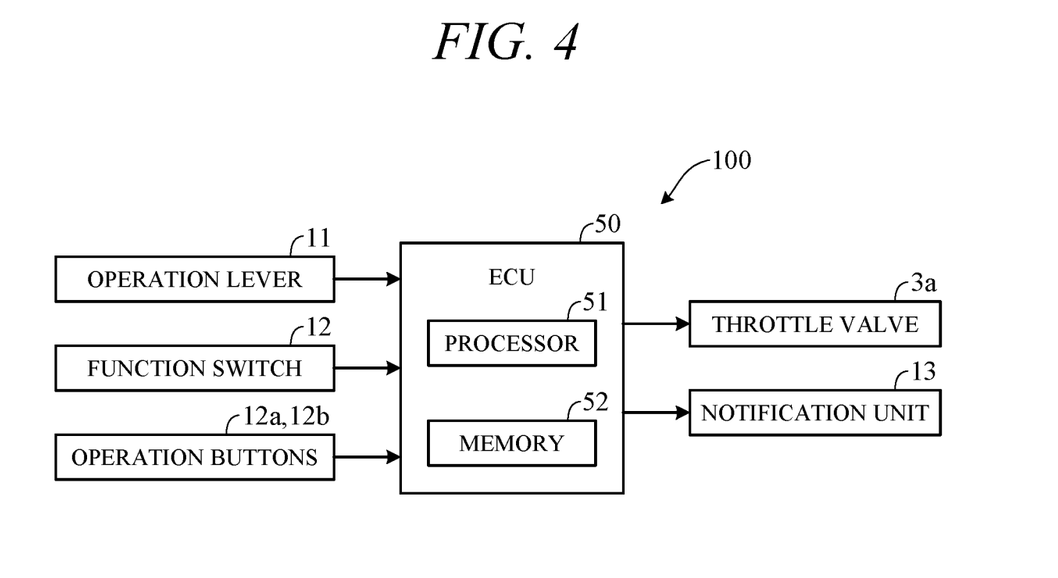
FIG. 4 is a block diagram schematically showing an example of main configuration of the constant-speed travel apparatus according to the embodiment of the present invention.

FIG. 4 is a block diagram schematically showing an example of main configuration of the constant-speed travel apparatus (apparatus) 100 according to the embodiment of the present invention. As shown in FIG. 4, the apparatus 100 is mainly configured as an electronic control unit (ECU) 50. The electronic control unit 50 includes a computer having a processor 51 such as a central processing unit (CPU), a memory 52 such as a ROM and RAM, and other peripheral circuits.

The electronic control unit 50 is mounted on the outboard motor 1 side, for example. The electronic control unit 50 can be mounted on the boat 2 side in the vicinity of the operator's seat. The electronic control unit 50 can be configured as an electronic control unit mounted on the outboard motor 1 side and an electronic control unit mounted on the boat 2 side. The electronic control unit 50 is connected with: the operation lever 11, a function switch 12, operation buttons 12a, 12b, and a notification unit 13 each provided on the control panel in front of the operator's seat; and the throttle valve 3a (actuator) of the engine 3 of the outboard motor 1 mounted on the stern.

As shown in FIG. 1, in the vicinity of the operation lever 11 of the control panel in front of the operator's seat, operation buttons 12a, 12b to be pressed by the operator are provided. When the operation button 12a is pressed, the throttle opening TH is finely adjusted to the opened side by a predetermined amount (e.g., 1%) in accordance with the number of operations (pressing operations) of the operation button 12a, and the engine output (engine speed) and the travel speed is finely adjusted to the speed-up side. When the operation button 12b is pressed, the throttle opening TH is finely adjusted to the closed side by a predetermined amount (e.g., 1%) in accordance with the number of operations (pressing operations) of the operation button 12b, and the engine output (engine speed) and the travel speed is finely adjusted to the speed-down side.

Thus, when either of the operation buttons 12a, 12b is operated, a "cruise mode", in which current travel speed is maintained or fine-tuned, is activated and starts. When the operation button 12a and the operation button 12b are simultaneously pressed and pressed for a long time, the cruise mode is deactivated and ends. Such operation buttons 12a, 12b are collectively referred to as a function switch 12 that activates or deactivates the cruise mode.

The operator adjusts the travel speed by the operation lever 11, and when the cruise mode is activated by the function switch 12, the travel speed can be finely adjusted to the travel speed of the time point when the cruise mode is activated by intermittent operations of pressing the operation buttons 12a, 12b. With this, the boat 2 can travel at a constant travel speed desired by the operator by simple operation.

The processor 51 of the electronic control unit 50 controls operation of the throttle valve 3a based on the opening degree of the operation lever 11 only, in a state where the cruise mode has not been activated. For example, when the opening degree of the operation lever 11 is 20%, operation of the throttle valve 3a is controlled so that the throttle opening TH becomes 20%.

The processor 51 of the electronic control unit 50 controls operation of the throttle valve 3a based on the lever opening sent from the operation lever 11 and the number of times of operation of the operation buttons 12a, 12b, in a state where the cruise mode has been activated. For example, when the operation button 12a is pressed three times after the cruise mode is activated with the opening degree of the operation lever 11 of 20%, operation of the throttle valve 3a is controlled so that the throttle opening TH becomes 23%. When the operation button 12b is pressed three times after the cruise mode is activated with the opening degree of the operation lever 11 of 20%, operation of the throttle valve 3a is controlled so that the throttle opening TH becomes 17%.

Figure 5:
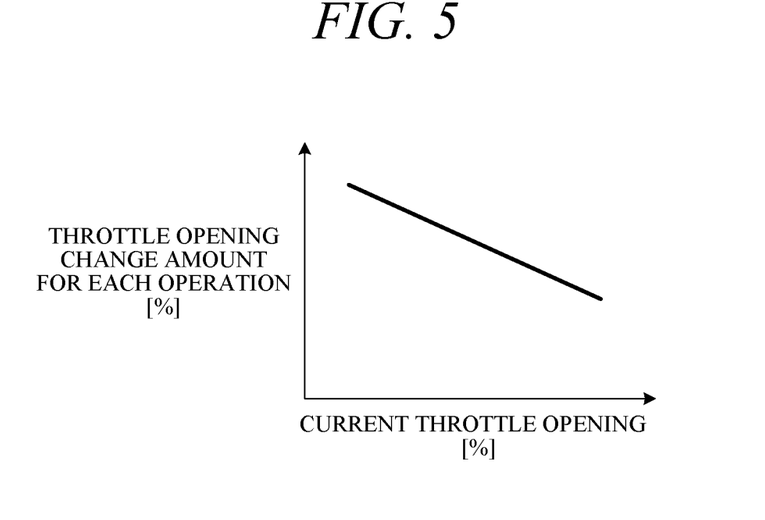
FIG. 5 is a diagram for explaining a change amount of a throttle opening at every operation of a function buttons shown in FIG. 1.

FIG. 5 is a diagram for explaining the change amount (predetermined amount) of the throttle opening TH at every operation of the operation buttons 12a, 12b. As shown in FIG. 5, the change amount of the throttle opening TH for each operation of the operation buttons 12a, 12b is determined to be smaller as the current throttle opening TH is larger. This characteristics of the change amount of the throttle opening TH are predetermined in accordance with the specifications or the like of the outboard motor 1 and the boat 2, and are stored in the memory 52 of the electronic control unit 50.

When adjusting the travel speed by changing the throttle opening TH, the higher the travel speed before the change, the greater the change amount of the travel speed. For example, if the throttle opening TH is changed by 1% when the travel speed before the change is 10 km/h, the travel speed changes by about 0.3 km/h, and if the throttle opening TH is changed by 1% when the travel speed before the change is 40 km/h, the travel speed changes by about 1.0 km/h. Therefore, if the change amount of the throttle opening TH for each pressing operation of the operation buttons 12a, 12b is determined as a uniform value, the change amount of the travel speed becomes larger as the travel speed before the change becomes higher, and fine-tuning of the travel speed becomes difficult.

By predetermining the change amount of the throttle opening TH for each pressing operation of the operation buttons 12a, 12b in accordance with the current throttle opening TH corresponding to the travel speed before the change, the change amount of the travel speed for each pressing operation can be uniformed, and fine-tuning of the travel speed can be facilitated even in the high-speed region. The characteristics of the change amount of the throttle opening TH can be determined to decrease, for example, in a curvilinear manner, or in a stepwise manner, in accordance with the current throttle opening TH. The characteristics of the change amount of the throttle opening TH can be determined in accordance with the current travel speed, instead of the current throttle opening TH.

Figure 6A:
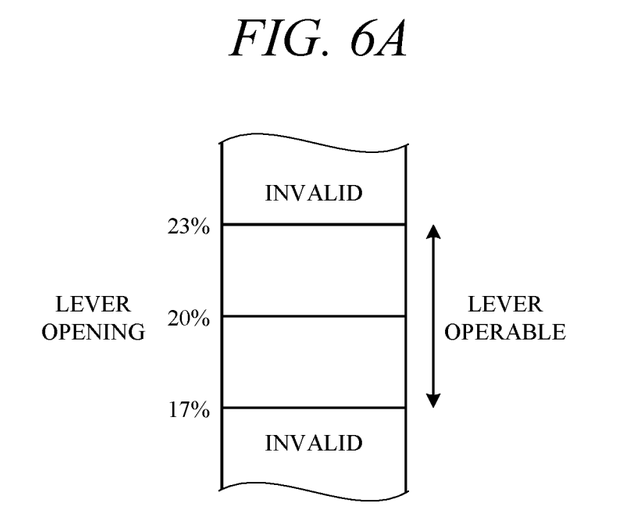
FIG. 6A is a diagram for explaining operation of the operation lever of FIG. 1 accepted in a cruise mode.
Figure 6B:
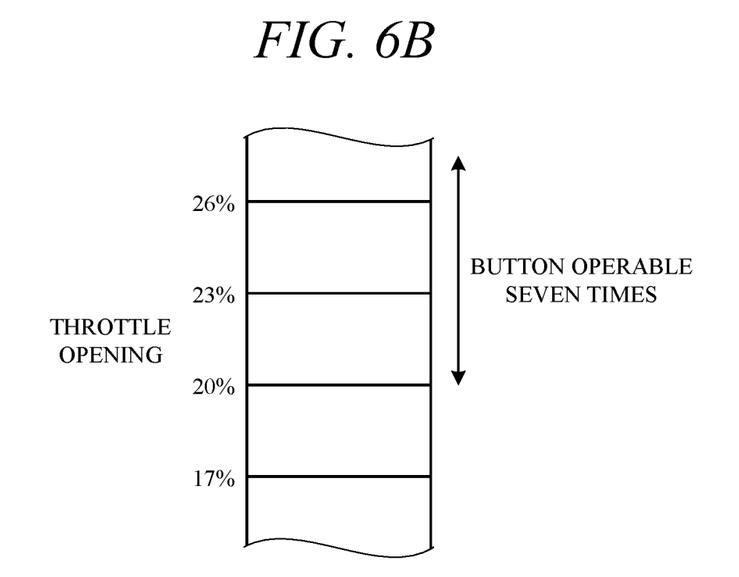
FIG. 6B is a diagram for explaining operation of the function button of FIG. 1 accepted in a cruise mode.

FIG. 6A and FIG. 6B are diagrams for explaining operation of the operation lever 11 and the operation buttons 12a, 12b accepted in the cruise mode. FIG. 6A shows an example of operation of the operation lever 11 accepted in the cruise mode, and FIG. 6B shows an example of operation of the operation buttons 12a, 12b accepted in the cruise mode.

As shown in FIG. 6A, the processor 51 of the electronic control unit 50 accepts operation of the operation lever 11 by a predetermined amount (e.g., 3%) or less after the cruise mode is started. That is, when the operation amount of the operation lever 11 after starting the cruise mode exceeds the predetermined amount, the cruise mode is deactivated, and operation of the throttle valve 3a is controlled based only on the current lever opening. For example, if the cruise mode is started in a state where the lever opening is 20%, when the lever opening exceeds 23%, or falls below 17%, the cruise mode is deactivated, and operation of the throttle valve 3a is controlled based on the current lever opening.

As shown in FIG. 6B, the processor 51 accepts operation of the operation buttons 12a, 12b within a predetermined number of times (e.g., seven times) after starting the cruise mode. That is, even if the operation buttons 12a, 12b is operated more than the predetermined number of times after the cruise mode is started, it is not accepted. For example, if the operation button 12a is operated seven times after the cruise mode is started with the lever opening of 20%, the throttle opening TH is finely adjusted to 27%, but even if the operation button 12a is further operated, the throttle opening TH is not finely adjusted any more.

If the operation lever 11 is operated after the cruise mode is started with the lever opening of 20%, the lever opening is changed to 23%, and the operation button 12a is further operated seven times, both operation of the operation lever 11 and operation of the operation buttons 12a, 12b are accepted. In this case, the throttle opening TH is fine-tuned to 30%.

As described above, if the operation amount of the operation lever 11 and the number of times of operation of the operation buttons 12a, 12b are within the predetermined ranges, the travel speed can be finely adjusted centering on the travel speed at the time of starting the cruise mode, so that the travel speed of the boat 2 can be maintained and finely adjusted as necessary. When the travel speed is changed beyond the fine-tuning range, the cruise mode can be deactivated by intuitive and simple operations such as operation of the operation lever 11 exceeding the predetermined operation amount.

As shown in FIG. 1, a notification unit 13 for notifying or informing the operator of various kinds of information relating to the state of the outboard motor 1 and the boat 2 is provided in the vicinity of the operator's seat. The notification unit 13 is configured as a display provided on the control panel in front of the operator's seat, a light, a speaker, a vibrator for vibrating the operation lever 11 or the steering wheel, or the like. The notification unit 13 makes a notification by sound, light, or vibration when the operation lever 11 has been operated by the predetermined amount and the cruise mode is to be deactivated with any further operation of the operation lever 11, or when the number of times of operation of the operation buttons 12a, 12b exceeds the predetermined number of times and any further operation cannot be accepted.

By making such notification in a timely manner, the operator can resume the cruise mode centering on a new lever opening in a timely manner as necessary. For example, when the operation lever 11 is tilted 3% forward with the lever opening of 20% and the throttle opening TH becomes 23%, the notification unit 13 makes notification, and the operator can then recognize that the upper limit of the fine adjustment range centered on the initial lever opening (20%) has been reached. In this case, the operator can continue constant speed navigation with a significant change in the travel speed by continuing operation of the operation lever 11 to change the travel speed significantly and then restarting the cruise mode with the function switch 12.

When the operation button 12a is operated eight times with the lever opening of 20%, the notification unit 13 makes notification, and the operator can recognize that the upper limit (27%) of the fine adjustment range centered on the initial lever opening (20%) has been reached. In this case, the operator can continue constant speed navigation with a significant change in the travel speed by drastically changing the travel speed with the operation lever 11 rather than the operation button 12*a* and then restarting the cruise mode with the function switch 12.

That is, even if the cruise mode is re-activated after being deactivated, it becomes possible to suppress variations in the throttle opening TH and the travel speed while the cruise mode is deactivated because the operator can perform timely operations by timely notification. More specifically, by operating the operation lever 11 in a timely manner prior to the current throttle opening TH, which has been finely adjusted with the operation buttons 12*a*, 12*b*, returning to the throttle opening TH corresponding to the current lever opening, variations in the throttle opening TH and the travel speed can be suppressed. With this, it becomes possible to continue stable constant speed navigation even when the travel speed is largely changed.

Since the notified regarding deactivation of the cruise mode is made by sound, light, or vibration, the operator can easily notice the notification even when he/she is not watching the notification unit 13. For example, even when the operator is finely adjusting the travel speed while looking at the stern direction of the flow of the lure, the operator can easily notice the notification and can restart the cruise mode in a timely manner as necessary.

Figure 7:
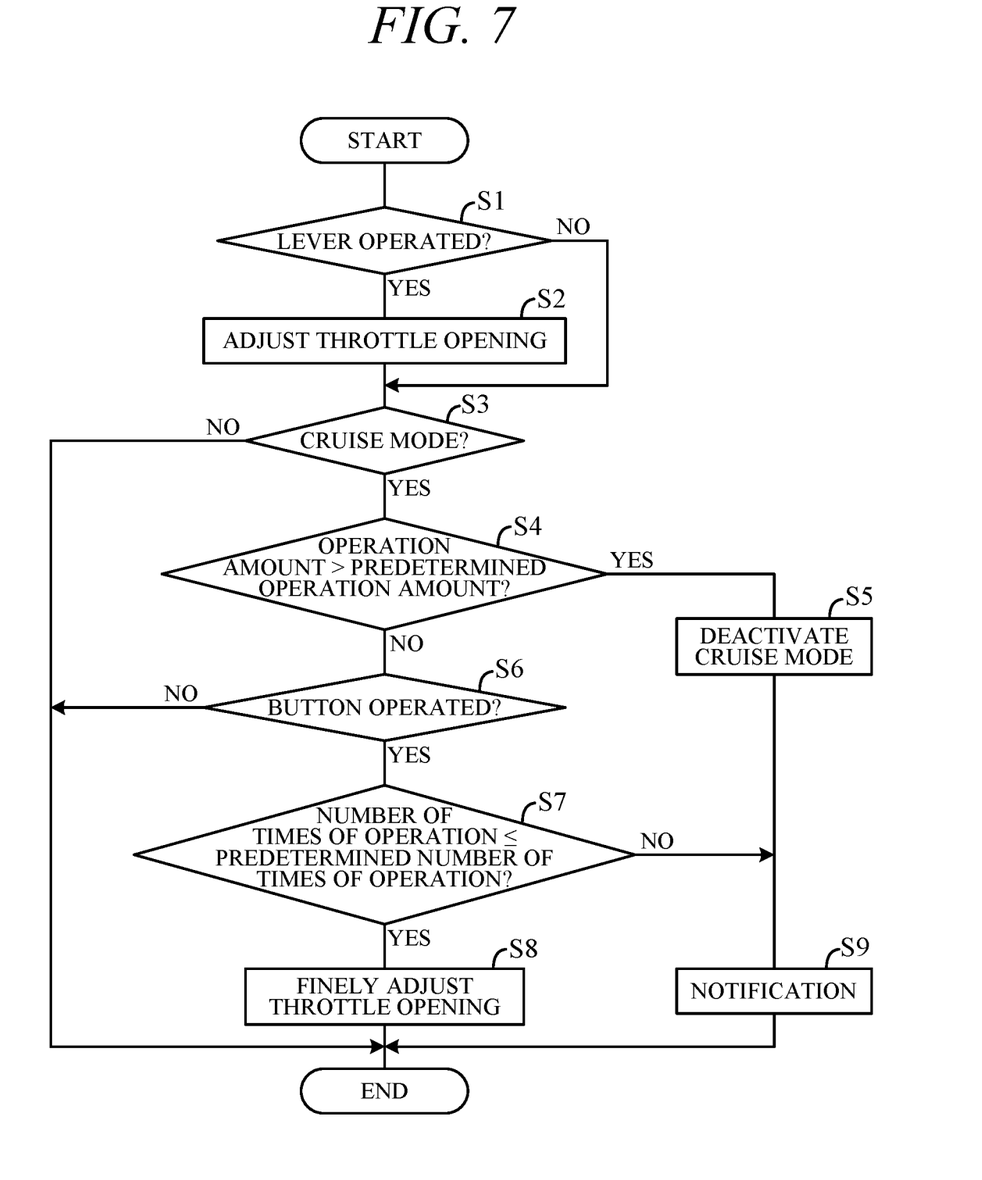
FIG. 7 is a flowchart showing an example of processing performed by the constant-speed travel apparatus according to the embodiment of the present invention.

FIG. 7 is a flowchart showing an example of processing performed by the processor 51 of the electronic control unit 50. The processing shown in FIG. 7 starts when the electronic control unit 50 is activated, and is repeated at predetermined intervals. For example, the processing is repeated each time when the operation lever 11 or the operation buttons 12*a*, 12*b* is operated.

As shown in FIG. 7, first, in S1 (S: processing step), it is determined whether the operation lever 11 is operated. When S1 is affirmative, the processing proceeds to S2, where the throttle opening TH is adjusted based on the lever opening of the operation lever 11. On the other hand, when S1 is negative, the processing proceeds to S3. In S3, it is determined whether the cruise mode has been activated by the function switch 12. When S3 is affirmative, the processing proceeds to S4. On the other hand, when S3 is negative, the processing ends. In S4, it is determined whether the operation amount of the operation lever 11 exceeds the predetermined operation amount. When S4 is affirmative, the processing proceeds to S5, where the cruise mode is deactivated and the processing proceeds to S9. On the other hand, when S4 is negative, the processing proceeds to S6.

In S6, it is determined whether the operation buttons 12*a*, 12*b* is operated. When S6 is affirmative, the processing proceeds to S7. On the other hand, when S6 is negative, the processing ends. In S7, it is determined whether the number of times of operation of the operation buttons 12*a*, 12*b* is equal to or smaller than the predetermined number of times of operation. When S7 is affirmative, the processing proceeds to S8, where the throttle opening TH is finely adjusted based on the lever opening of the operation lever 11 of the time point when the cruise mode is activated and the characteristics of the change amount of the throttle opening TH stored in the memory 52. On the other hand, when S7 is negative, the processing proceeds to S9, where the notification is made.

As described above, in the cruise mode, since the travel speed is roughly adjusted with the operation lever 11 and then finely adjusted with the operation buttons 12*a*, 12*b*, it becomes possible for the operator to navigate the boat 2 at a constant speed while adjusting to the desired travel speed with simple operations by the operator (S1 to S8). If the operator would change the travel speed beyond the fine-tuning range, the cruise mode can be deactivated by intuitive and simple operations such as operation of the operation lever 11 exceeding the predetermined operation amount (S4 to S5). Since the notification is made when the operation amount or the number of times of operation exceeds the fine-adjustment range, the operator can continue stable constant speed navigation even when largely changing the travel speed by restarting the cruise mode in a timely manner as necessary (S4, S7, S9).

The present embodiment can achieve advantages and effects such as the following:

(1) The apparatus 100 is configured to control the engine 3 of the outboard motor 1 so that the boat 2 mounted with the outboard motor 1 travels at a constant speed. The apparatus 100 includes: the function switch 12 configured to be instructed activation of the cruise mode for maintaining the travel speed of the boat 2 in response to operation by the operator; the operation lever 11 configured to be instructed the travel speed in accordance with the operation amount by the operator; the operation buttons 12*a*, 12*b* configured to be instructed change of the travel speed by the predetermined amount in response to operation by the operator in the state where activation of the cruise mode has been instructed; and the electronic control unit 50 configured to control the engine output based on the operation amount of the operation lever 11 and the number of times of operation of the operation buttons 12*a*, 12*b* so that the boat 2 travels at a constant speed in the state where activation of the cruise mode has been instructed (FIG. 1, FIG. 4). The electronic control unit 50 deactivates the cruise mode and controls the engine output based on the travel speed instructed through the operation lever 11 when the operation amount of the operation lever 11 exceeds the predetermined operation amount in the state where activation of the cruise mode has been instructed.

Since the travel speed is roughly adjusted with the operation lever 11 and, after the cruise mode is activated, finely adjusted with the operation buttons 12*a*, 12*b*, the boat 2 can travel at a constant travel speed desired by the operator by simple operations. Also, since the cruise mode is deactivated in response to operation of the operation lever 11 exceeding the predetermined operation amount, the travel speed can be changed beyond the fine-tuning range even during the cruise mode with simple operations for the operator.

(2) The apparatus 100 further includes: the notification unit 13 configured to make the notification when the operation amount of the operation lever 11 exceeds the predetermined operation amount or when the number of times of operation of the operation buttons 12*a*, 12*b* exceeds the predetermined number of times of operation in the state where activation of the cruise mode has been instructed (FIG. 1, FIG. 4). Since the notification is made when the operation amount of the operation lever 11 or the number of times of operation of the operation buttons 12*a*, 12*b* exceeds the fine-adjustment range, it becomes for the operator to continue stable constant speed navigation even when largely changing the travel speed is by restarting the cruise mode in a timely manner as necessary.

(3) The notification unit 13 makes the notification by at least one of sound, light, and vibration. With this, the operator can easily notice the notification to restart the cruise mode in a timely manner as necessary even when the operator is not watching the notification unit 13 provided on the control panel, for example, when the operator is finely adjusting the travel speed while looking at the stern.

(4) The electronic control unit 50 changes the engine output by the predetermined amount predetermined in accordance with the travel speed of the boat 2 at every operation of the operation buttons 12*a*, 12*b* in the state where activation of the cruise mode has been instructed (FIG. 5). For example, when adjusting the travel speed by adjusting the engine output with the throttle valve 3*a*, if the throttle opening TH to be changed for each pressing operation of the operation buttons 12*a*, 12*b* is predetermined as a uniform value, the change amount of the travel speed becomes larger as the travel speed before the change becomes higher, and fine adjustment of the travel speed becomes difficult. By predetermining the change amount of the throttle opening TH for each pressing operation of the operation buttons 12*a*, 12*b* in accordance with the current throttle opening TH corresponding to the travel speed before the change, it becomes possible to make the change amount of the travel speed for each pressing operation uniform and make fine-tuning of the travel speed easier even in the high-speed region.

(5) The throttle opening TH in accordance with the operation amount by the operator is instructed through the operation lever 11, and the change of the throttle opening TH by the predetermined amount is instructed through the operation buttons 12*a*, 12*b* in response to operation by the operator. That is, when the operator operates the operation lever 11, the throttle opening TH is adjusted in accordance with the lever opening, which is the operation amount of the operation lever 11, and the travel speed is adjusted accordingly. When the operator operates the operation buttons 12*a*, 12*b*, the throttle opening TH is finely adjusted in accordance with the predetermined characteristics predetermined according to the number of times of operation of the operation buttons 12*a*, 12*b*, and the travel speed is finely adjusted accordingly.

(6) Continuous operation of the operator is inputted through the operation lever 11, and intermittent operations of the operator is inputted through the operation buttons 12*a*, 12*b* (FIG. 1). That is, the operator can finely adjust the travel speed by intermittent operations of pressing the operation buttons 12*a*, 12*b* after adjusting the travel speed by continuous operation of tilting the operation lever 11 forward or backward and activating the cruise mode.

In the above embodiment, the apparatus 100 which controls the engine 3 of the outboard motor 1 so that the boat 2 mounted with the outboard motor 1 is mounted navigates at a constant speed has been exemplified, but a constant-speed travel apparatus configured to control a prime mover so that a mobile body mounted with the prime mover travels at a constant speed is not limited to this example. The mobile body may be any one mounted with the prime mover, and may be a mobile body which travels on the water, underwater, on the land, or in the air. For example, the mobile body may be a trocar mounted with the prime mover.

In the above embodiment, an example where the engine 3 is controlled by controlling operation of the throttle valve 3*a* has been described, but the prime mover is not limited to an engine whose intake air quantity and output are controlled through the throttle opening. For example, the prime mover may be an engine whose output is controlled through fuel injection quantity or a motor or the like.

In the above embodiment, an example of specific notification times by the notification unit 13 has been described with reference to FIG. 6A, FIG. 6B, etc., but these are examples, and a predetermined operation amount of a first speed operation member and a predetermined number of times of operation of a second speed operation member, where a notification unit make a notification is not limited to such examples.

In the above embodiment, a specific operation lever 11 has been exemplified with reference to FIG. 1, etc., but a first speed operation member configured to be instructed the travel speed in accordance with the operation amount by the operator is not limited to this example. For example, the first speed operation member may be one that is instructed the travel speed in accordance with the operation amount by turning a dial knob. Alternatively, the first speed operation member may be an operation member displayed on a display. Although specific operation buttons 12*a*, 12*b* have been exemplified with reference to FIG. 1, etc., a second speed operation member configured to be instructed a change of the travel speed by a predetermined amount in response to operation by the operator is not limited to this example. For example, the second speed operation member may be an operation member displayed on a display.

In the above embodiment, the operation buttons 12*a*, 12*b* also serve as the function switch 12 for activating the cruise mode have been exemplified with reference to FIG. 1, etc., but a function operation member configured to be instructed activation of speed maintaining function in response to operation by the operator is not limited to this example. For example, a function operation member may be a function switch provided separately from the operation buttons.

The above embodiment can be combined as desired with one or more of the aforesaid modifications. The modifications can also be combined with one another.

According to the present invention, it becomes possible to travel at a constant speed desired by the operator.

Above, while the present invention has been described with reference to the preferred embodiments thereof, it will be understood, by those skilled in the art, that various changes and modifications may be made thereto without departing from the scope of the appended claims.

The invention claimed is:

1. A constant-speed travel apparatus configured to control a prime mover so that a mobile body mounted with the prime mover travels at a constant speed, comprising:
    a function operation member configured to be instructed activation of a speed maintaining function for maintaining a travel speed of the mobile body in response to operation by an operator;
    a first speed operation member configured to be instructed the travel speed in accordance with an operation amount by the operator;
    a second speed operation member configured to be instructed a change of the travel speed by a predetermined amount in response to operation by the operator in a state where activation of the speed maintaining function has been instructed through the function operation member; and
    an electronic control unit configured to control an output of the prime mover based on the operation amount of the first speed operation member and a number of times of operation of the second speed operation member so that the mobile body travels at a constant speed in the state where activation of the speed maintaining function has been instructed through the function operation member, wherein
    the electronic control unit deactivates the speed maintaining function and controls the output of the prime mover based on the travel speed instructed through the first speed operation member when the operation amount of the first speed operation member exceeds a predetermined operation amount in the state where activation of the speed maintaining function has been instructed through the function operation member.

2. The constant-speed travel apparatus according to claim 1, further comprising:
a notification unit configured to make a notification when the operation amount of the first speed operation member exceeds the predetermined operation amount or when the number of times of operation of the second speed operation member exceeds a predetermined number of times of operation in the state where activation of the speed maintaining function has been instructed through the function operation member.

3. The constant-speed travel apparatus according to claim 2, wherein
the notification unit makes the notification by at least one of a sound, a light, and a vibration.

4. The constant-speed travel apparatus according to claim 1, wherein
the electronic control unit changes the output of the prime mover by the predetermined amount predetermined in accordance with the travel speed at every operation of the second speed operation member in the state where activation of the speed maintaining function has been instructed through the function operation member.

5. The constant-speed travel apparatus according to claim 1, wherein
the mobile body is a boat.

6. The constant-speed travel apparatus according to claim 5, wherein
the prime mover is an engine of an outboard motor.

7. The constant-speed travel apparatus according to claim 1, wherein
the prime mover is an engine including a throttle valve, wherein
the first speed operation member is instructed an opening of the throttle valve in accordance with the operation amount by the operator, wherein
the second speed operation member is instructed a change of the opening of the throttle valve by the predetermined amount in response to operation by the operator.

8. The constant-speed travel apparatus according to claim 1, wherein
the first speed operation member is an operation lever to be inputted continuous operation of the operator, wherein
the second speed operation member is an operation button to be inputted intermittent operations of the operator.

* * * * *